United States Patent
Peterson (10) Patent No.: US 10,127,397 B2
(45) Date of Patent: Nov. 13, 2018

(54) METHOD FOR STRONGLY ENCRYPTING .ZIP FILES

(71) Applicant: PKWARE, Inc., Milwaukee, WI (US)

(72) Inventor: James C. Peterson, Menomonee Falls, WI (US)

(73) Assignee: PKWARE, INC., Milwaukee, WI (US)

( * ) Notice: Subject to any disclaimer, the term of this patent is extended or adjusted under 35 U.S.C. 154(b) by 0 days.

(21) Appl. No.: 14/753,888

(22) Filed: Jun. 29, 2015

(65) Prior Publication Data

US 2016/0026816 A1    Jan. 28, 2016

Related U.S. Application Data

(63) Continuation of application No. 13/489,011, filed on Jun. 5, 2012, now Pat. No. 9,098,721, which is a continuation of application No. 10/945,292, filed on Sep. 20, 2004, now Pat. No. 8,225,108, which is a continuation of application No. 10/620,960, filed on Jul. 16, 2003.

(51) Int. Cl.
*G06F 21/62* (2013.01)
*H04L 9/08* (2006.01)
*G06F 17/30* (2006.01)

(52) U.S. Cl.
CPC .... *G06F 21/6218* (2013.01); *G06F 17/30153* (2013.01); *G06F 21/6209* (2013.01); *H04L 9/088* (2013.01); *G06F 2221/2107* (2013.01); *G06F 2221/2153* (2013.01); *H04L 2209/30* (2013.01)

(58) Field of Classification Search
None
See application file for complete search history.

(56) References Cited

U.S. PATENT DOCUMENTS

| | | |
|---|---|---|
| 4,041,284 A | 8/1977 | Bond |
| 4,156,922 A | 5/1979 | Majerski et al. |
| 4,179,746 A | 12/1979 | Tubbs |
| 4,377,846 A | 3/1983 | Yoshida |
| 4,521,866 A | 6/1985 | Petit et al. |
| 4,542,453 A | 9/1985 | Patrick et al. |
| 4,792,954 A | 12/1988 | Arps et al. |
| 4,862,167 A | 8/1989 | Copeland |

(Continued)

FOREIGN PATENT DOCUMENTS

| | | |
|---|---|---|
| JP | 9-223052 | 8/1997 |
| WO | WO 99/49391 | 9/1999 |

OTHER PUBLICATIONS

PKWARE, "Appnote.txt," Version 1.0 (1990).

(Continued)

*Primary Examiner* — Minh Dinh
(74) *Attorney, Agent, or Firm* — Barich IP Law Group (57) ABSTRACT

The present invention provides a method of integrating existing strong encryption methods into the processing of a .ZIP file to provide a highly secure data container which provides flexibility in the use of symmetric and asymmetric encryption technology. The present invention adapts the well-established .ZIP file format to support higher levels of security and multiple methods of data encryption and key management, thereby producing a highly secure and flexible digital container for electronically storing and transferring confidential data.

16 Claims, 2 Drawing Sheets

(56) References Cited

U.S. PATENT DOCUMENTS

| | | | |
|---|---|---|---|
| 4,891,643 | A | 1/1990 | Mitchell et al. |
| 4,905,297 | A | 2/1990 | Langdon, Jr. et al. |
| 4,933,883 | A | 6/1990 | Pennebaker et al. |
| 4,935,882 | A | 6/1990 | Pennebaker et al. |
| 4,939,639 | A | 7/1990 | Lee et al. |
| 4,947,318 | A | 8/1990 | Mineo |
| 4,989,000 | A | 1/1991 | Chevion et al. |
| 5,003,307 | A | 3/1991 | Whiting et al. |
| 5,016,009 | A | 5/1991 | Whiting et al. |
| 5,025,258 | A | 6/1991 | Duttweiler |
| 5,051,745 | A | 9/1991 | Katz |
| 5,091,955 | A | 2/1992 | Iseda et al. |
| 5,099,440 | A | 3/1992 | Pennebaker et al. |
| 5,126,739 | A | 6/1992 | Whiting et al. |
| 5,142,283 | A | 8/1992 | Chevion et al. |
| 5,146,221 | A | 9/1992 | Whiting et al. |
| 5,150,209 | A | 9/1992 | Baker et al. |
| 5,155,847 | A | 10/1992 | Kirouac et al. |
| 5,159,336 | A | 10/1992 | Rabin et al. |
| 5,179,555 | A | 1/1993 | Videlock et al. |
| 5,218,700 | A | 6/1993 | Beechick |
| 5,270,712 | A | 12/1993 | Iyer et al. |
| 5,272,478 | A | 12/1993 | Allen |
| 5,274,805 | A | 12/1993 | Ferguson et al. |
| 5,298,896 | A | 3/1994 | Lei et al. |
| 5,315,655 | A | 5/1994 | Chaplin |
| 5,363,099 | A | 11/1994 | Allen |
| 5,404,315 | A | 4/1995 | Nakano et al. |
| 5,414,425 | A | 5/1995 | Whiting et al. |
| 5,440,504 | A | 8/1995 | Ishikawa et al. |
| 5,446,895 | A | 8/1995 | White et al. |
| 5,455,946 | A | 10/1995 | Mohan |
| 5,463,390 | A | 10/1995 | Whiting et al. |
| 5,463,772 | A | 10/1995 | Thompson et al. |
| 5,465,224 | A | 11/1995 | Guttag et al. |
| 5,469,564 | A | 11/1995 | Junya |
| 5,475,388 | A | 12/1995 | Gormish et al. |
| 5,481,713 | A | 1/1996 | Wetmore et al. |
| 5,485,411 | A | 1/1996 | Guttag et al. |
| 5,493,524 | A | 2/1996 | Guttag et al. |
| 5,506,580 | A | 4/1996 | Whiting et al. |
| 5,517,439 | A | 5/1996 | Suzuki et al. |
| 5,532,694 | A | 7/1996 | Mayers et al. |
| 5,535,300 | A | 7/1996 | Hall, II et al. |
| 5,546,080 | A | 8/1996 | Langdon, Jr. et al. |
| 5,563,595 | A | 10/1996 | Strohacker |
| 5,581,697 | A | 12/1996 | Gramlich et al. |
| 5,587,710 | A | 12/1996 | Choo et al. |
| 5,590,350 | A | 12/1996 | Guttag et al. |
| 5,592,162 | A | 1/1997 | Printz et al. |
| 5,594,674 | A | 1/1997 | Printz et al. |
| 5,596,763 | A | 1/1997 | Guttag et al. |
| 5,600,847 | A | 2/1997 | Guttag et al. |
| 5,623,546 | A | 4/1997 | Hardy et al. |
| 5,627,995 | A | 5/1997 | Miller et al. |
| 5,634,065 | A | 5/1997 | Guttag et al. |
| 5,640,578 | A | 6/1997 | Balmer et al. |
| 5,654,702 | A | 8/1997 | Ran |
| 5,659,616 | A | 8/1997 | Sudia |
| 5,671,389 | A | 9/1997 | Saliba |
| 5,675,645 | A | 10/1997 | Schwartz et al. |
| 5,682,152 | A | 10/1997 | Wang et al. |
| 5,689,452 | A | 11/1997 | Cameron |
| 5,694,128 | A | 12/1997 | Kim |
| 5,696,954 | A | 12/1997 | Guttag et al. |
| 5,699,275 | A | 12/1997 | Beasley et al. |
| 5,715,470 | A | 2/1998 | Asano et al. |
| 5,732,214 | A | 3/1998 | Subrahmanyam |
| 5,734,119 | A | 3/1998 | France et al. |
| 5,734,880 | A | 3/1998 | Guttag et al. |
| 5,737,345 | A | 4/1998 | Pelz et al. |
| 5,745,756 | A | 4/1998 | Henley |
| 5,771,355 | A | 6/1998 | Kuzma |
| 5,774,081 | A | 6/1998 | Cheng et al. |
| 5,778,374 | A | 7/1998 | Dang et al. |
| 5,781,901 | A | 7/1998 | Kuzma |
| 5,802,520 | A | 9/1998 | Jerkunica et al. |
| 5,802,549 | A | 9/1998 | Goyal et al. |
| 5,805,913 | A | 9/1998 | Guttag et al. |
| 5,808,572 | A | 9/1998 | Yang et al. |
| 5,813,011 | A | 9/1998 | Yoshida et al. |
| 5,818,369 | A | 10/1998 | Withers |
| 5,828,848 | A | 10/1998 | Maccormack et al. |
| 5,832,273 | A | 11/1998 | Mizuse |
| 5,832,520 | A | 11/1998 | Miller |
| 5,838,996 | A | 11/1998 | deCarmo |
| 5,841,865 | A | 11/1998 | Sudia |
| 5,844,575 | A | 12/1998 | Reid |
| 5,847,980 | A | 12/1998 | Okamoto et al. |
| 5,854,597 | A | 12/1998 | Murashita et al. |
| 5,857,035 | A | 1/1999 | Rust |
| 5,867,600 | A | 2/1999 | Hongu |
| 5,881,225 | A | 3/1999 | Worth |
| 5,903,723 | A | 5/1999 | Beck et al. |
| 5,907,703 | A | 5/1999 | Kronenberg et al. |
| 5,909,638 | A | 6/1999 | Allen |
| 5,911,776 | A | 6/1999 | Guck |
| 5,912,636 | A | 6/1999 | Gormish et al. |
| 5,918,002 | A | 6/1999 | Klemets et al. |
| 5,933,503 | A | 8/1999 | Schell et al. |
| 5,937,188 | A | 8/1999 | Freeman |
| 5,940,507 | A | 8/1999 | Cane et al. |
| 5,956,733 | A | 9/1999 | Nakano et al. |
| 5,960,117 | A | 9/1999 | Hiratani |
| 5,926,208 | A | 10/1999 | Hasebe |
| 5,961,635 | A | 10/1999 | Guttag et al. |
| 5,970,097 | A | 10/1999 | Ishiwaka et al. |
| 5,974,539 | A | 10/1999 | Guttag et al. |
| 5,986,594 | A | 11/1999 | Nakayama et al. |
| 5,995,747 | A | 11/1999 | Guttag et al. |
| 5,995,748 | A | 11/1999 | Guttag et al. |
| 6,018,747 | A | 1/2000 | Burns et al. |
| 6,021,198 | A | 2/2000 | Anigbogu et al. |
| 6,023,506 | A | 2/2000 | Ote et al. |
| 6,028,541 | A | 2/2000 | Levine |
| 6,032,200 | A | 2/2000 | Lin |
| 6,041,147 | A | 3/2000 | Mead |
| 6,043,763 | A | 3/2000 | Levine |
| 6,047,318 | A | 4/2000 | Becker et al. |
| 6,049,630 | A | 4/2000 | Wang et al. |
| 6,049,671 | A | 4/2000 | Slivka et al. |
| 6,052,531 | A | 4/2000 | Waldin et al. |
| 6,061,732 | A | 5/2000 | Korst et al. |
| 6,078,921 | A | 6/2000 | Kelley |
| 6,083,279 | A | 7/2000 | Cuomo et al. |
| 6,088,717 | A | 7/2000 | Reed et al. |
| 6,091,777 | A | 7/2000 | Guetz et al. |
| 6,094,453 | A | 7/2000 | Gosselin et al. |
| 6,098,163 | A | 8/2000 | Guttag et al. |
| 6,112,211 | A | 8/2000 | Bradshaw et al. |
| 6,116,768 | A | 9/2000 | Guttag et al. |
| 6,118,392 | A | 9/2000 | Levine |
| 6,121,904 | A | 9/2000 | Levine |
| 6,122,378 | A | 9/2000 | Yoshiura et al. |
| 6,125,348 | A | 9/2000 | Levine |
| 6,144,320 | A | 11/2000 | Van Der Vleuten |
| 6,145,069 | A | 11/2000 | Dye |
| 6,148,340 | A | 11/2000 | Bittinger |
| 6,151,609 | A | 11/2000 | Truong |
| 6,154,771 | A | 11/2000 | Rangan et al. |
| 6,157,706 | A | 12/2000 | Rachelson |
| 6,161,218 | A | 12/2000 | Taylor |
| 6,161,219 | A | 12/2000 | Ramkumar et al. |
| 6,166,664 | A | 12/2000 | Acharya |
| 6,167,453 | A | 12/2000 | Becker et al. |
| 6,173,317 | B1 | 1/2001 | Chaddha et al. |
| 6,173,394 | B1 | 1/2001 | Guttag et al. |
| 6,182,045 | B1 | 1/2001 | Kredo et al. |
| 6,185,681 | B1 | 2/2001 | Zizzi |
| 6,188,334 | B1 | 2/2001 | Bengio et al. |
| 6,195,026 | B1 | 2/2001 | Acharya |
| 6,198,412 | B1 | 3/2001 | Goyal |
| 6,217,234 | B1 | 4/2001 | Dewar et al. |
| 6,225,925 | B1 | 5/2001 | Bengio et al. |

(56) References Cited

U.S. PATENT DOCUMENTS

| | | | |
|---|---|---|---|
| 6,229,463 B1 | 5/2001 | Van Der Vleuten et al. |
| 6,233,017 B1 | 5/2001 | Chaddha |
| 6,233,565 B1 | 5/2001 | Lewis et al. |
| 6,236,341 B1 | 5/2001 | Dorward et al. |
| 6,275,848 B1 | 8/2001 | Arnold |
| 6,289,509 B1 | 9/2001 | Kryloff |
| 6,324,525 B1 | 11/2001 | Kramer et al. |
| 6,345,288 B1 | 2/2002 | Reed et al. |
| 6,356,937 B1 | 3/2002 | Montville et al. |
| 6,363,363 B1 | 3/2002 | Haller et al. |
| 6,363,486 B1 | 3/2002 | Knapton, III |
| 6,366,930 B1 | 4/2002 | Parker et al. |
| 6,373,950 B1 | 4/2002 | Rowney |
| 6,378,054 B1 | 4/2002 | Karasudani et al. |
| 6,381,742 B2 | 4/2002 | Forbes et al. |
| 6,401,241 B1 | 6/2002 | Taylor |
| 6,405,265 B1 | 6/2002 | Kronenberg et al. |
| 6,415,435 B1 | 7/2002 | Mcintyre |
| 6,427,149 B1 | 7/2002 | Rodriguez et al. |
| 6,434,561 B1 | 8/2002 | Durst et al. |
| 6,456,985 B1 | 9/2002 | Ohtsuka |
| 6,460,044 B1 | 10/2002 | Wang |
| 6,466,999 B1 | 10/2002 | Sliger et al. |
| 6,477,703 B1 | 11/2002 | Smith et al. |
| 6,484,259 B1 | 11/2002 | Barlow |
| 6,487,278 B1 | 11/2002 | Skladman et al. |
| 6,498,835 B1 | 12/2002 | Skladman et al. |
| 6,522,268 B2 | 2/2003 | Belu |
| 6,526,574 B1 | 2/2003 | Jones |
| 6,529,908 B1 | 3/2003 | Piett et al. |
| 6,539,396 B1 | 3/2003 | Bowman-Amuah |
| 6,546,417 B1 | 4/2003 | Baker |
| 6,567,793 B1 | 5/2003 | Hicks et al. |
| 6,577,311 B1 | 6/2003 | Crosby et al. |
| 6,577,735 B1 | 6/2003 | Bharat |
| 6,594,822 B1 | 7/2003 | Schweitz et al. |
| 6,604,106 B1 | 8/2003 | Bodin et al. |
| 6,615,350 B1 | 9/2003 | Schell et al. |
| 6,629,150 B1 | 9/2003 | Huded |
| 6,635,088 B1 | 10/2003 | Hind et al. |
| 6,657,702 B1 | 12/2003 | Chui et al. |
| 6,684,331 B1 | 1/2004 | Srivastava |
| 6,742,176 B1 | 5/2004 | Million et al. |
| 6,760,845 B1* | 7/2004 | Cafarelli | H04L 41/24 726/22 |
| 6,785,677 B1 | 8/2004 | Fritchman |
| 6,785,810 B1 | 8/2004 | Lirov et al. |
| 6,807,632 B1 | 10/2004 | Carpentier et al. |
| 6,850,248 B1 | 2/2005 | Crosby et al. |
| 6,870,547 B1 | 3/2005 | Crosby et al. |
| 6,879,988 B2 | 4/2005 | Basin et al. |
| 6,883,032 B1 | 4/2005 | Dempski |
| 6,892,382 B1 | 5/2005 | Hapner et al. |
| 6,904,110 B2 | 6/2005 | Trans et al. |
| 6,914,985 B1 | 7/2005 | Shrader et al. |
| 6,934,836 B2 | 8/2005 | Strand et al. |
| 6,952,823 B2 | 10/2005 | Kryloff et al. |
| 6,959,300 B1 | 10/2005 | Caldwell et al. |
| 6,976,165 B1 | 12/2005 | Carpentier et al. |
| 6,981,141 B1 | 12/2005 | Mahne et al. |
| 6,983,371 B1 | 1/2006 | Hurtado et al. |
| 6,996,251 B2 | 2/2006 | Malone et al. |
| 7,069,271 B1 | 6/2006 | Fadel et al. |
| 7,085,850 B2 | 8/2006 | Calvignac et al. |
| 7,127,712 B1 | 10/2006 | Noble et al. |
| 7,133,846 B1 | 11/2006 | Ginter et al. |
| 7,136,882 B2 | 11/2006 | Collins et al. |
| 7,139,811 B2 | 11/2006 | Lev Ran et al. |
| 7,139,918 B2 | 11/2006 | Chang et al. |
| 7,149,896 B1 | 12/2006 | Bahl et al. |
| 7,184,573 B2 | 2/2007 | Malone et al. |
| 7,298,851 B1 | 11/2007 | Hendricks et al. |
| 7,386,726 B2 | 6/2008 | Gehrmann et al. |
| 7,434,052 B1 | 10/2008 | Rump |
| 8,572,757 B1 | 10/2013 | Stamos et al. |
| 2001/0002485 A1 | 5/2001 | Bisbee et al. |
| 2001/0014884 A1 | 8/2001 | Dillard et al. |
| 2001/0023360 A1 | 9/2001 | Nelson et al. |
| 2001/0029530 A1 | 10/2001 | Naito et al. |
| 2001/0030667 A1 | 10/2001 | Kelts |
| 2001/0037309 A1 | 11/2001 | Vrain |
| 2001/0042121 A1 | 11/2001 | Defosse et al. |
| 2001/0055407 A1 | 12/2001 | Rhoads |
| 2002/0007287 A1 | 1/2002 | Straube et al. |
| 2002/0029227 A1 | 3/2002 | Multer et al. |
| 2002/0029228 A1 | 3/2002 | Rodriguez et al. |
| 2002/0040369 A1 | 4/2002 | Multer et al. |
| 2002/0042833 A1 | 4/2002 | Hendler et al. |
| 2002/0049717 A1 | 4/2002 | Routtenberg et al. |
| 2002/0059144 A1 | 5/2002 | Meffert et al. |
| 2002/0076052 A1 | 6/2002 | Yung et al. |
| 2002/0078466 A1 | 6/2002 | Beyda |
| 2002/0120639 A1 | 8/2002 | Basin et al. |
| 2002/0178439 A1 | 11/2002 | Rich et al. |
| 2002/0184509 A1 | 12/2002 | Scheidt et al. |
| 2002/0188605 A1 | 12/2002 | Adya et al. |
| 2003/0016770 A1 | 1/2003 | Trans et al. |
| 2003/0034905 A1 | 2/2003 | Anton et al. |
| 2003/0046572 A1 | 3/2003 | Newman et al. |
| 2003/0065873 A1 | 4/2003 | Collins et al. |
| 2003/0115169 A1 | 6/2003 | Ye |
| 2003/0144858 A1 | 7/2003 | Jain et al. |
| 2003/0233494 A1 | 12/2003 | Ghosh et al. |
| 2004/0030898 A1 | 2/2004 | Tsuria et al. |
| 2004/0098715 A1 | 5/2004 | Aghera |
| 2004/0107125 A1 | 6/2004 | Guheen et al. |
| 2004/0117845 A1 | 6/2004 | Karaoguz |
| 2005/0055357 A1 | 3/2005 | Campbell |
| 2005/0060356 A1 | 3/2005 | Saika |
| 2005/0097077 A1 | 5/2005 | Bolosky et al. |
| 2005/0147946 A1 | 7/2005 | Ramamurthy et al. |
| 2005/0188058 A1 | 8/2005 | Inoue |
| 2005/0251686 A1 | 11/2005 | Torrubia-Saez |
| 2006/0143199 A1 | 6/2006 | Peterson et al. |
| 2006/0143691 A1 | 6/2006 | Peterson et al. |
| 2006/0155731 A1 | 7/2006 | Peterson et al. |
| 2006/0173985 A1 | 8/2006 | Moore |
| 2006/0200253 A1 | 9/2006 | Hoffberg et al. |
| 2006/0200761 A1 | 9/2006 | Judd et al. |
| 2006/0253451 A1 | 11/2006 | Van de Sluis et al. |
| 2006/0265330 A1 | 11/2006 | Fukasawa |
| 2006/0265760 A1 | 11/2006 | Daemke et al. |
| 2014/0157435 A1 | 6/2014 | Stamos et al. |
| 2014/0304835 A1 | 10/2014 | Odnovorov et al. |

OTHER PUBLICATIONS

PKWARE, "Appnote.txt," Version 2.0.
PKWARE, "Appnote.txt," Version 4.5 (Nov. 1, 2001).
PKWARE, "Appnote.txt," Version 6.2.1 (Apr. 1, 2005).
PKWARE, "Appnote.txt," Version 6.2.2 (Jan. 6, 2006).
PKWARE, "Appnote.txt," Version 63.2 (Sep. 28, 2007).
Bray N: "How Digital Certificates Work", Computers & Security, Elsevier Science Publishers, Amsterdam, NL, vol. 16, No. 1, 1997, p. 62, XP004063818, ISSN: 0167-4048.
Campbell D: "Extending the Windows Explorer with Name Space Extensions", Microsoft Systems Journal, Microsoft Corp., Redmond, WA, US, vol. 5, No. 6, Jul. 1996, pp. 89-96, XP000874429, ISSN: 0889-9932.
Cevenini G et al: "A Multiprovider, Universal, E-Mail Service for the Secure Exchange of Legally-Binding Multimedia Documents," Conference Proceedings Article, 2000, pp. 47-50, XP 010515038.
"Chilkat Encryption .NET Component—RSA / AES," Jul. 12, 2003, Retrieved from the Internet on Jan. 17, 2007: URL: <http:I/web.archive.org/web/20030712162512/http://www.visual-mp3.com/review/4017. html>.
CuteZIP InfoGuide, p. 1, retrieved from Internet Sep. 9, 2003.
Denning, "Cryptography and Data Security," 1982, Addison-Wesley, pp. 92-98.
Desmond, "PKWare Offers Encryption for .ZIP Files," Jul. 16, 2002, Retrieved from the Internet on Sep. 30, 2016: URL: <http://www.esecurityplanet.com/prodser/article.php/10753 1408191>.

(56) References Cited

OTHER PUBLICATIONS

"GlobalSCAPE Releases CuteZIP 1.0, the Next-Generation ZIP Utility, Combining Music and File Compress," GlobalSCAPE, Mar. 2000, Retrieved from the Internet on Mar. 31, 2007, URL: <http://www.cuteftp.com/company/press.aspx?id=20>.
Green M., Top Ten File Compression Tools, Mar. 12, 1999, http://pcworld.com.
John Leyden: "Zip File Encryption Compromise Thrashed Out", Internet Article, Online!, Jan. 21, 2004, XP002296118, http://www.theregister.co.uk/2004/01/21/zip file encryption compromise thrashed/.
Mark Nelson, Dr. Dobbs Journal: "LZW Data Compression," Internet Article, Online!, Oct. 1989, XP002296120, http://www.dogma.neUmarkn/articles/lzw/lzw.htm.
Menezes et al., "Handbook of Applied Cryptography," 1997, CRC Press, pp. 506-515.
Menezes et al., "Handbook of Applied Cryptography," 1997, CRC Press, pp. 555-566.
Nelson, "Data Compression with the Burrows Wheeler Transform," Jul. 2001, Retrieved from the Internet on Jan. 23, 2007: URL: <http://www.ddj.com/184409957>.
PalmHandZipper by HandWatch, Inc., Handango—Admin Product Detail, retrieved from the Internet on Jul. 1, 2008, URL: <http://www.handango.com/AdminProductDetailView.jsp?siteId= 1&productId=23214&platform Id=1&productType=2>.
PKCS # 7: Cryptographic Message Syntax Standard, RSA Laboratories, 1993, Retrieved from the Internet on Jul. 6, 2008: <URL: ftp://ftp.rsasecurity.com/pub/pkcs/ps/pkcs-7.ps>.
PKWARE, "Appnote.txt" 1998 Version, Jul. 1998, Retrieved from the Internet on Jan. 5, 2009: <URL: http://http://mediasrv.ns.ac.yu/extra/fileformat/archive/zip/zip.txt>.
PKWARE, "X.509 Digital Certificates and the .ZIP File Archive," Retrieved from the Internet on Jan. 5, 2009: <URL: http://mycroft.com.au/clients/mycroft. nsf/downloadlookup/pkzx509. pdf/$File/pkzx509. pdf ?Open Element>.
PKWARE: "Appnote.txt—.zip file format specification", Internet Article, Online!, Jan. 11, 2001, XP002296121, http://www.the7soft.com/file-formats/file-formats-Archivers/zi p45.zip.
"PlexCrypt 4.2 User Manual," Jun. 2003, Retrieved from the Internet on Jan. 17, 2007: URL: <http://www.plexobject.com/software/plexcrypUdocs/plexcrypt. pdf>.
"PlexCrypt Compression-Encryption 3.1 details," Aug. 2001, Retrieved from the Internet on Jan. 17, 2007: URL: <http://www.downloadsofts.com/download/Security-Privacy/Encryption-Tools/PlexCrypt-Compression-Encryptio n-download-detai ls.html>.
"PlexCrypt Compression-Encryption 3.1," Aug. 2001, Retrieved from the Internet on Jan. 17, 2007: URL: <http://www.fivesign.com/downloads/program/PlexCrypt-CompressionEncryption 6715 66.html>.
"PlexCrypt Compression-Encryption," Aug. 2001, Retrieved from the Internet on Jan. 17, 2007: URL: <http://www.exefind.com/plexcrypt-compression-encryption-P13552.html>.
Press Release PKWARE, Inc.: "PKWARE Releases New ZIP Format Specification", Internet Article, Online!, Dec. 2001, XP002296119, URL:http://www.pkware.com/news/releases/2001/120501. php.
Randal C Burns: "Differential Compression: A Generalized Solution for Binary Files", THESIS, Dec. 1996, XP002211282.
Reichenberger C: "Delta Storage for Arbitrary Non-Text Files", 1991, New York, NY, US, pp. 144-152, XP008030925, ISBN: 0-89791-429-5.
Roth et al., "Access Control and Key Management for Mobile Agents," Elsevier Science Ltd., 1998.
Schneier et al., "Twofish :A 128-Bit Block Cipher," Abstract, Jun. 1998, Retrieved from the Internet on Mar. 31, 2007, URL: <http://www.schneier.com/paper-twofish-paper.html>.
Schneier, "Applied Cryptography," 1996, John Wiley & Sons, 2nd Edition, pp. 270-278.
Schneier, "Applied Cryptography," 1996, John Wiley & Sons, 2nd Edition, pp. 336-339.
Schneier, "Applied Cryptography," 1996, John Wiley & Sons, 2d Edition, pp. 523-525.
SecuriSys, "SafenSigned makes Software Distributed over the Net Safe and Sound," Shareware Press Release, Retrieved from the Internet on Mar. 3, 2004: URL: <http://www. dpdirectory.com/prsecuri. htm.
Sems, "The Short Version—Compression Software Saves You Time & Money," Feb. 2002, Smart Computing, Retrieved from the Internet on Sep. 30, 2006: URL: <http://www.smartcomputing.com/editorial/ article.asp?article=articles/2002/s 1302/04s02/04s02. asp&articleid=11585&guid.
Smartphone & Pocket PC Magazine, URL: <http://www.pocketpcmag.com/_archives/mar03/zayo.asp>, Mar. 2003, vol. 6, No. 1.
Spector, "Updated WinZip Alters Zip Format," May 30, 2003, PC World, Retrieved from the Internet on Sep. 30, 2006: URL: ttp://www.pcworld.com/article/id, 110820-page, 1/article.html>.
Stallings, W., Cryptography and Network Security: Principles and Practice, 1999, Prentice Hall, 2nd Edition, pp. 164-206 and 356-398.
Tip et al., "Practical Experience with an Application Extractor for JAVA," Oct. 1999, ACM, p. 292-305.
Web Site Information: http://203.162.7.85/unescocourse/computervision/101.htm#10.Image Compression, 10.1 Introduction to image compression, pp. 1-2, retrieved from internet Apr. 11, 2006.
Web Site Information: http://corsoft.com/aileron.asp, Palm Email with attachments, Corsoft, pp. 1-2, retrieved from Internet Apr. 4, 2006.
Web Site Information: http://cuteftp.com/cutezip/features.asp, GlobalSCAPE—CuteZIP, CuteZIP2.1 Features, pp. 1-2, retrieved from Internet Sep. 9, 2003.
Web Site Information: http://cuteftp.com/cutezip/tour_ 1.asp, GlobalSCAPE—CuteZIP, Product Feature Tour: CuteZIP, pp. 1-7, retrieved from Internet Sep. 9, 2003.
Web Site Information: http://dogma.net/DataCompression/ArithmeticCoding.shtml, The Data Compression Library—Arithmetic Coding, pp. 1-4, retrieved from Internet Apr. 13, 2006.
Web Site Information: http://reviews.cnet.com/4505-3514_7-204 71822-2.html?legacy=cent&tag=dir, Globalscape CuteZip 2.1—Full review—Browsers-CNET Reviews, pp. 1-3, retrieved from Internet Sep. 9, 2003.
Web Site Information: http://www.cc.gatech.edu/-kingd/comp_links.html, Data Compression and Information Theory Links, pp. 1-2, retrieved from Internet Apr. 13, 2006.
Web Site Information: http://www.cs.duke.edu/-jsv/Papers/catalog/node63. , retrieved from the Internet html#HoV:ACsurvey, External Memory Algorithms, 1/0 Efficiency, pp. 1-2, Apr. 13, 2006.
Web Site Information: http://www.cuteftp.com/cutezip/, GlobalSCAPE-CuteZIP—Compression Software, p. 1, retrieved from Internet Mar. 3, 2004.
Web Site Information: http://www.dpdirectory.com/prescuri.htm, Shareware Press Release, pp. 1-4, retrieved from Internet Mar. 3, 2004.
Web Site Information: http://www.hn.is.uec.ac.jp/-arimura/compression_links.html, Mitsuharu ARIMURA's Bookmarks on Source Coding/Data Compression, pp. 1-12, retrieved from Internet Apr. 13, 2006.
Web Site Information: http://www.noisette-software.com/products/pocketpc/CrunchIt/, CrunchIt for Microsoft Pocket PC, pp. 1-3, retrieved from Internet Apr. 4, 2006.
Web Site Information: http://www.plexobject.com/software/plexcrypt, PlexObject Solutions, Inc., pp. 1-2, retrieved from Internet Apr. 4, 2006.
Web Site Information: http://www.pocketsoft.com/oem/overview.html, Pocket Soft, Inc.—RTPatch OEM, pp. 1-3, retrieved from Internet Nov. 12, 2001.
Web Site Information: http://www.pocketsoft.com/products.html, Pocket Soft, Inc.—Products Page, pp. 1-2, retrieved from Internet Nov. 12, 2001.
Web Site Information: http://www.pocketsoft.com/products.html, RTPatch Professional Products, pp. 1-4, retrieved from Internet Apr. 23, 1998.
Web Site Information: http://www.pocketsoft.com/unix/overview.html, Pocket Soft, Inc.—RTPatch for UNIX, pp. 1-2, retrieved from Internet Nov. 12, 2001.

(56) References Cited

OTHER PUBLICATIONS

Web Site Information: http://www.pocketsoft.com/vxworks/overview.html, Pocket Soft, Inc.—RTPatch for VxWorks, pp. 1-2, retrieved from Internet Nov. 12, 2001.
Web Site Information: http://www.pocketsoft.com/wince/overview.html, Pocket Soft, Inc.—RTPatch for CE, pp. 1-2, retrieved from Internet Nov. 12, 2001.
Web Site Information: http://www.pocketsoft.com/windows/overview.html, Pocket Soft, Inc.—RTPatch for Windows, pp. 1-2, retrieved from Internet Nov. 12, 2001.
Web Site Information: http://www.resco.net/pocketpc/explorer/default.asp, Resco Explorer 2005 for Pocket PC, pp. 1-2, retrieved from Internet Apr. 4, 2006.
Web Site Information: http://home.worldnet.fr/mounierr/HomePage.html, Welcome to Arjfolder Official Site, pp. 1-2, retrieved from Internet Feb. 15, 2000.
Web Site Information: http://www.cleverness.com/cleverzip/browse/explorer.html, CleverZip—Explorer View, p. 1, retrieved from Internet Feb. 15, 2000.
Web Site Information: http://www.creative.net/-acco/, AECO Systems Presents . . . Zip Explorer Pro v2.54, p. 1, retrieved from Internet Feb. 15, 2000.
Web Site Information: http://www.knoware.com/in32docs/index.html, Internet Neighborhood FTP Client—The Premier FTP Namespace Extension for Windows, pp. 1-2, retrieved from Internat Feb. 15, 2000.
Web Site Information: http://www.knoware.com/in32docs/screenshots.html, Internet Neighborhood—the premier FTP Namespace Extension, KnoWare, Inc., Award-Winning Internet Utilities, pp. 1-3, retrieved from Internat Feb. 15, 2000.
Web Site Information: http://www.mijeniz.com/zipmagic2000.asp, ZipMagic 2000—Take the Hassleout of Zip files!, Mijenix Corporation, pp. 1-2.
Web Site Information: http://www.mijeniz.com/zm2000primer.asp, ZipMagic 2000 Compression Primer, Mijenix Corporation, pp. 1-2, retrieved from Internat Mar. 7, 2000.
Web Site Information: http://www.netexplore.de/english/features.htm, Features, FTP in a New Generation, pp. 1-2, retrieved from Internat Feb. 15, 2000.
Web Site Information: http://www.netzip.com/products/Info_Netzip_Win.html, Netzip—Award Winning Zip File, Download, and File Viewing Utilities, Netzip 5 Top Internet Programs, pp. 1-3, retrieved from Internat Feb. 15, 2000.
Web Site Information: http://www1.sprintpcs.com/media/Assets/Equipment/Handsets/pdf/samsungspi600.pdf, Sprint PCS VisionSM Smart Device SP-i600 by Samsung® User's Guide, pp. 1-182.
Web Site Information: Feldspar, "An Explanation of the DEFLATE Algorithm," Aug. 23, 1997, http://www.gzip.org/deflate.html, accessed on Jan. 20, 2010.
WinAce 2.6.5, Nov. 30, 1999, E-Merge, http://winace.com.
"Winzip" Announcement Nico Mak Computing, XX, XX, 1995, pp. 1-106, XP002908148.
Winzip Computing, Inc.: "AES Encryption Information", Internet Article, Online!, May 15, 2003, XP002296117, http://web.archive.org/web/20030618094654/http://www. winzip.com/aes info.htm.
Ziv J et al: "A Universal Algorithm for Sequential Data Compression", IEEE Transactions on Information Theory, IEEE Inc. New York, US, vol. 23, No. 3, 1977, pp. 337-343, XP002911734, ISSN: 0018-9448.
Ziv J et al: "Compression of Individual Sequences Via Variable-Rate Coding", IEEE Transactions on Information Theory, IEEE Inc. New York, US, vol. IT-24, No. 5, Sep. 1978, pp. 530-536, XP000565213.
PKWARE Appnote—Sep. 29, 2006.
PKWARE, "PKZIP® 6.0 for Windows Getting Started Manual" (Jan. 28, 2003).
PKWARE, "Appnote.txt," Version 5.2 (Jun. 2, 2003).
PKWARE, "Appnote.txt," Version 5.2.1 (Oct. 6, 2003).
PKWARE, "Appnote.txt," Version 5.2.4 (Jan. 12, 2004).
PKWARE, "Appnote.txt," Version 6.2.0 (Apr. 26, 2004).
Notice of Acceptance for Australia Patent Application No. 23208 / Serial No. 785475; filed Nov. 3, 2002.
European Search Report for Application No. EP 02 25 1648; dated Mar. 25, 2004.
Examination Report for European Application No. 02 251 648.8 - 1225; dated Apr. 8, 2005.
Summons to attend oral proceedings for European Application No. 02 251 648.8 - 1225; dated Apr. 27, 2007.
Decision to refuse European Application No. 02 251 648.8 - 1225; dated Sep. 17, 2007.
Office Action dated Apr. 25, 2003; for U.S. Appl. No. 09/803,355, filed Mar. 9, 2001.
Office Action dated Jan. 14, 2004; for U.S. Appl. No. 09/803,355, filed Mar. 9, 2001.
Notice of Allowance dated Sep. 17, 2004; for U.S. Appl. No. 09/803,355, filed Mar. 9, 2001.
Office Action dated Oct. 31, 2008; for U.S. Appl. No. 11/588,003, filed Oct. 26, 2006.
Office Action dated Apr. 15, 2009; for U.S. Appl. No. 11/588,003, filed Oct. 26, 2006.
Office Action dated Aug. 7, 2007; for U.S. Appl. No. 10/970,897, filed Oct. 21, 2004.
Office Action dated Jan. 23, 2008; for U.S. Appl. No. 10/970,897, filed Oct. 21, 2004.
Office Action dated May 9, 2008; for U.S. Appl. No. 10/970,897, filed Oct. 21, 2004.
Office Action dated Oct. 1, 2008; for U.S. Appl. No. 10/970,897, filed Oct. 21, 2004.
Office Action dated Apr. 7, 2009; for U.S. Appl. No. 10/970,897, filed Oct. 21, 2004.
Office Action dated Oct. 29, 2008; for U.S. Appl. No. 11/586,869, filed Oct. 26, 2006.
Office Action dated May 19, 2009; for U.S. Appl. No. 11/586,869, filed Oct. 26, 2006.
Pre-interview first office action dated Mar. 4, 2009; for U.S. Appl. No. 11/586,891, filed Oct. 26, 2006.
Office Action dated Sep. 18, 2009; for U.S. Appl. No. 11/586,891, filed Oct. 26, 2006.
Office Action dated Oct. 21, 2008; for U.S. Appl. No. 11/586,868, filed Oct. 26, 2006.
Office Action dated Apr. 3, 2009; for U.S. Appl. No. 11/586,868, filed Oct. 26, 2006.
Pre-interview first office action dated Oct. 28, 2008; for U.S. Appl. No. 11/588,006, filed Oct. 26, 2006.
Office Action dated Mar. 18, 2009; for U.S. Appl. No. 11/588,006, filed Oct. 26, 2006.
Office Action dated Apr. 10, 2009; for U.S. Appl. No. 11/588,007, filed Oct. 26, 2006.
Office Action dated Mar. 31, 2009; for U.S. Appl. No. 11/588,005, filed Oct. 26, 2006.
Pre-interview first office action dated Nov. 26, 2008; for U.S. Appl. No. 11/586,834, filed Oct. 26, 2006.
Office Action dated Jan. 12, 2009; for U.S. Appl. No. 11/586,834, filed Oct. 26, 2006.
Office Action dated Apr. 30, 2009; for U.S. Appl. No. 11/586,834, filed Oct. 26, 2006.
Office Action dated Mar. 19, 2009; for U.S. Appl. No. 11/586,867, filed Oct. 26, 2006.
Office Action dated Sep. 10, 2009; for U.S. Appl. No. 11/586,867, filed Oct. 26, 2006.
Office Action dated Feb. 3, 2009; for U.S. Appl. No. 11/586,866, filed Oct. 26, 2006.
Office Action dated Sep. 3, 2009; for U.S. Appl. No. 11/586,866, filed Oct. 26, 2006.
Office Action dated Apr. 29, 2010; for U.S. Appl. No. 11/586,866, filed Oct. 26, 2006.
Notice of Allowance dated Oct. 5, 2010; for U.S. Appl. No. 11/586,866, filed Oct. 26, 2006.
Office Action dated Apr. 21, 2008; for U.S. Appl. No. 11/358,865, filed Feb. 21, 2006.
Office Action dated Oct. 27, 2008; for U.S. Appl. No. 11/358,865, filed Feb. 21, 2006.

(56) References Cited

OTHER PUBLICATIONS

Office Action dated Apr. 3, 2009; for U.S. Appl. No. 11/358,865, filed Feb. 21, 2006.
Office Action dated Apr. 18, 2008; for U.S. Appl. No. 11/358,534, filed Feb. 21, 2006.
Office Action dated Oct. 29, 2008; for U.S. Appl. No. 11/358,534, filed Feb. 21, 2006.
Office Action dated Jun. 8, 2009; for U.S. Appl. No. 11/358,534, filed Feb. 21, 2006.
Office Action dated Oct. 28, 2008; for U.S. Appl. No. 11/358,497, filed Feb. 21, 2006.
Office Action dated Apr. 10, 2009; for U.S. Appl. No. 11/358,497, filed Feb. 21, 2006.
Office Action dated Oct. 28, 2008; for U.S. Appl. No. 11/358,505, filed Feb. 21, 2006.
Office Action dated Apr. 16, 2009; for U.S. Appl. No. 11/358,505, filed Feb. 21, 2006.
Office Action dated Apr. 21, 2008; for U.S. Appl. No. 11/358,745, filed Feb. 21, 2006.
Office Action dated Oct. 28, 2008; for U.S. Appl. No. 11/358,745, filed Feb. 21, 2006.
Office Action dated Mar. 18, 2009; for U.S. Appl. No. 11/358,745, filed Feb. 21, 2006.
Office Action dated Mar. 31, 2008; for U.S. Appl. No. 11/358,002, filed Feb. 21, 2006.
Office Action dated Oct. 15, 2008; for U.S. Appl. No. 11/358,002, filed Feb. 21, 2006.
Office Action dated Apr. 1, 2009; for U.S. Appl. No. 11/358,002, filed Feb. 21, 2006.
Office Action dated Nov. 19, 2009; for U.S. Appl. No. 11/358,002, filed Feb. 21, 2006.
Office Action dated Jul. 20, 2009; for U.S. Appl. No. 11/358,844, filed Feb. 21, 2006.
Office Action dated Jan. 14, 2010; for U.S. Appl. No. 11/358,844, filed Feb. 21, 2006.
Office Action dated Jul. 7, 2010; for U.S. Appl. No. 11/358,844, filed Feb. 21, 2006.
Office Action dated Mar. 3, 2009; for U.S. Appl. No. 11/358,859, filed Feb. 21, 2006.
Office Action dated May 28, 2009; for U.S. Appl. No. 11/358,318, filed Feb. 21, 2006.
Office Action dated Feb. 18, 2010; for U.S. Appl. No. 11/358,318, filed Feb. 21, 2006.
Office Action dated Oct. 28, 2008; for U.S. Appl. No. 11/358,533, filed Feb. 21, 2006.
Office Action dated Apr. 29, 2009; for U.S. Appl. No. 11/358,533, filed Feb. 21, 2006.
Office Action dated Dec. 28, 2009; for U.S. Appl. No. 11/358,533, filed Feb. 21, 2006.
Notice of Allowance dated Oct. 6, 2010; for U.S. Appl. No. 11/358,533, filed Feb. 21, 2006.
Office Action dated Mar. 3, 2009; for U.S. Appl. No. 11/358,498, filed Feb. 21, 2006.
Office Action dated Dec. 24, 2008; for U.S. Appl. No. 11/358,518, filed Feb. 21, 2006.
Office Action dated Jul. 7, 2009; for U.S. Appl. No. 11/358,518, filed Feb. 21, 2006.
Office Action dated Dec. 3, 2009; for U.S. Appl. No. 11/358,518, filed Feb. 21, 2006.
Office Action dated Jul. 8, 2009; for U.S. Appl. No. 11/358,839, filed Feb. 21, 2006.
Office Action dated Mar. 11, 2010; for U.S. Appl. No. 11/358,839, filed Feb. 21, 2006.
Office Action dated Mar. 3, 2009; for U.S. Appl. No. 11/358,324, filed Feb. 21, 2006.
Office Action dated Nov. 23, 2009; for U.S. Appl. No. 11/358,324, filed Feb. 21, 2006.
Office Action dated Aug. 17, 2010; for U.S. Appl. No. 11/358,324, filed Feb. 21, 2006.
AES Encryption Information, WinZip Computing, May 15, 2013.

* cited by examiner

| Local Record Header for File 1 |
| --- |
| Decryption Header for File 1 |
| Compressed/Encrypted Data for File 1 |
| Local Record Header for File 2 |
| Decryption Header for File 2 |
| Compressed/Encrypted Data for File 2 |
| . . . |
| Local Record Header for File *n* |
| Decryption Header for File *n* |
| Compressed/Encrypted Data for File *n* |
| Central Directory Record for File 1 |
| Central Directory Record for File 2 |
| . . . |
| Central Directory Record for File *n* |
| Central End Record |

FIG. 1

PRIOR ART

FIG. 2

METHOD FOR STRONGLY ENCRYPTING .ZIP FILES

The present application is a continuation of application Ser. No. 13/489,011, filed on Jun. 5, 2012, entitled "METHOD FOR STRONGLY ENCRYPTING .ZIP FILES," which is a continuation of application Ser. No. 10/945,292, filed on Sep. 20, 2004, now U.S. Pat. No. 8,225,108, entitled "METHOD AND SYSTEM FOR MIXED SYMMETRIC AND ASYMMETRIC ENCRYPTION OF .ZIP FILES," which is a continuation of application Ser. No. 10/620,960, filed on Jul. 16, 2003, entitled "METHOD AND SYSTEM FOR STRONGLY ENCRYPTING .ZIP FILES," now abandoned, all of which are hereby incorporated by reference in their entirety.

BACKGROUND

The present invention relates generally to a method of using standard .ZIP files and strong encryption technology to securely store files, and more particularly to a method of integrating existing strong encryption methods into the processing of .ZIP files to provide a highly secure data container which provides flexibility in the use of symmetric and asymmetric encryption technology. The present invention adapts the well-established and widely used .ZIP file format to support higher levels of security and multiple methods of data encryption and key management, thereby producing an efficient, highly secure and flexible digital container for electronically storing and transferring confidential data.

Compression of computer files has been available for many years. Compressing files can save large amounts of disk space, and can reduce transfer time when downloading files from the Internet or transferring files through email. Almost any file one downloads from the Internet is compressed in some way. A standard compressed file or folder as it is sometimes called contains one or more files that were compressed into a single file or folder. Many different compression formats have been developed over the years. The .ZIP format, created by the assignee of the present invention, is perhaps the most common compressed file format for the personal computer. Any file with a ".zip" extension most likely contains one or more files of data archived, that is, each either compressed or stored, in the .ZIP format. "Zipping" a file has become a commonly used term meaning to compress the file into the .ZIP format archive so that it occupies less disk space, and similarly, "unzipping" a file means decompressing a compressed file in the .ZIP format.

A .ZIP file is generally recognized as a data compression and archiving format invented by PKWARE, Inc. The .ZIP format is a file format designed for combining data compression technology with file archiving techniques. Many commercially available software products are available for compressing or "zipping" files or other data into the .ZIP format. These .ZIP files can then be used to reconstruct the original data through the "unzipping" process. Data compression converts the contents of a file into an encoded format requiring less computer storage space or in the case of transmission less network bandwidth than the original uncompressed file.

Archiving, in the context of a .ZIP file, is a method of storing information about the characteristics of a file in a catalogue of files, known as the Central Directory, inside the .ZIP file, allowing each file to be retrieved individually by its characteristics. This capability is widely used. These characteristics include, but are not limited to, file name, file size, and file creation date and time.

Software programs such as PKZIP® written by PKWARE, Inc. are used to process files in the .ZIP format; Such programs allow one or more files of any type to be compressed and archived into a file of the .ZIP format type for efficient file storage and transmission over computer and communication networks. This format and the software programs that process .ZIP files have become ubiquitous.

Data encryption is used by many software programs to provide data privacy. Data encryption is a method of encoding data so that it cannot be reproduced in its original form unless an associated key is provided. Decryption uses this key to convert the encrypted data back into its original state. The key is known only to the person encrypting the data or by those other people with whom the person encrypting the data chooses to share the key. The key is used to "unlock" the data so that it can again be used in its original form.

Keys are uniquely generated using data known to the person encrypting a file or other data associated with recipients and users of the file. This data can be a user-defined password or other random data. Several methods are commonly used for processing the keys used for data encryption. Encryption using a key generated from a password is an example of symmetric encryption. Encryption using a public/private key pair is an example of asymmetric encryption. An example of one method for processing encryption keys supported by this invention uses a public/private key pair commonly associated with digital certificates as defined by the document Internet X.509 Public Key Infrastructure Certificate and CRL Profile (RFC 2459). A digital certificate is a unique digital identifier associating a public and private key pair to an assigned individual, a group, or an organization. When used for encrypting data, the public key of an individual is used to process an encryption key which only the individual in possession of the corresponding private key can use for decryption. A digital certificate is issued to an individual, a group, or an organization for a fixed period of time and can only be used during this time period. After the time period has elapsed, the digital certificate will be considered to have expired and must be reissued for a new time period.

The strength of a data encryption method is determined at least in part by its key size in bits. The larger the key size a data encryption method uses, the more resistant it is to cryptanalysis. Cryptanalysis, or popularly "cracking", is the unauthorized access to encrypted data. Strong encryption is a type of data encryption that uses key sizes of 128 bits or more. A number of encryption encoding methods are known today. Examples supported by the present invention include but are not limited to Advanced Encryption Standard (AES), Data Encryption Standard (DES), 2DES, 3DES, and others. A number of key sizes are commonly used today. Examples supported by the present invention include but are not limited to 128 bits, 192 bits, and 256 bits.

Many software programs available today that process .ZIP files use data encryption to encrypt files after compression as they are written to the .ZIP file. The data encryption method used by these software programs uses a key size of 96 bits or less and is considered weak or moderate encryption by today's standards. These software programs use keys generated using user-defined password data. Weak data encryption may not provide sufficient security to computer users that store and transfer their confidential data files using the .ZIP format.

Password-based key generation has been a commonly used method of applying data encryption, however, known vulnerabilities to cracking methods such as "brute force password cracking" make this method of encryption insufficient to meet today's more advanced security needs. Another known limitation of password-based security is the lack of non-repudiation. Non-repudiation is the ability to be certain that the person or program that created an encrypted .ZIP file cannot deny that fact and that their identity is bound to the .ZIP file they created. This cannot be achieved with symmetric encryption methods. Today, non-repudiation is an important aspect of security related to the implementation of digital certificates and digital signatures. It is critically important to be able to prove that a creator or sender of an encrypted file did in fact create the file, i.e. not repudiate his/her action.

Therefore, a need exists to extend the options for levels of security available to programs that process .ZIP files. This extended of security capability makes use of the encryption technologies available today or others that may gain acceptance in the future.

SUMMARY OF THE INVENTION

The present invention provides a method of integrating multiple strong encryption methods into the processing of .ZIP files to provide a highly secure data container which provides flexibility in the use of symmetric and asymmetric encryption technology. The present invention adapts the well-established .ZIP file format to support higher levels of security and multiple methods of data encryption and key management, thereby producing a highly secure and flexible digital container for storing and transferring confidential electronic data.

The present invention provides a method of integrating multiple strong encryption methods into the processing of .ZIP files to provide a highly secure data container which provides flexibility in the use of encryption technology. The present invention supports existing weak encryption methods available in .ZIP software programs used today to ensure backward compatibility with existing software programs that use the .ZIP file format. Strong encryption methods are made available to computer users as configurable options to select when compressing and encrypting their files or other data into a .ZIP file.

The method of the present invention provides the capability of using strong encryption when creating .ZIP files. It is flexible in that it provides that different encryption methods can be applied to a single .ZIP file to meet the security needs of a given computer user or application. Strong encryption algorithms are preferably used in conjunction with either password (symmetric) or any form of public/private key (asymmetric) encryption methods. The symmetric method preferably includes a password defined by the user, while the asymmetric method preferably includes a public/private key associated with digital certificates to process encryption keys. The invention allows one or more passwords and one or more public keys to be used individually, or in combination at the same time when archiving any file of any type of data into a secure .ZIP file. This capability is useful since secure .ZIP files are frequently distributed, or otherwise made accessible, to multiple recipients for decryption. Some of those recipients may require password access while others may require certificate access.

The method of the present invention also supports the four basic security functions to be associated with encrypted files: confidentiality, message authentication, sender or creator authentication, and non-repudiation.

Specifically, the present invention supports non-repudiation to uniquely bind a .ZIP file with the identity of its creator, and prevent that creator from denying the creation of that .ZIP file. One method of non-repudiation used by this invention is the identity support available with digital signatures that can be generated using public/private key technology. The non-repudiation function provided by the present invention also preferably supports time-stamping methods for fixing the creation of a digital signature in time, as well as time-stamped audit trails providing transaction history.

As indicated, the method of the present invention also supports message authentication. Message authentication ensures the data has not been altered since being encrypted. The present invention supports message authentication techniques that employ public/private key forms of message authentication, as well as other methods of message authentication that do not require the use of public/private keys. One example of an alternative method that does not use a public/private key is a cryptographic checksum.

The method of the present invention further supports the encryption of file characteristics for each file inside a .ZIP file. Current ZIP software programs encrypt only the contents of the files in a .ZIP file. The additional characteristics for each file, such as its name, size, etc., remain unencrypted. To remove the possibility that this unencrypted data for a file could be made available to an unauthorized user, this information may preferably also be encrypted as an option. This additional encryption further increases the level of security available to .ZIP file users.

Public keys such as those associated with digital certificates used for encrypting .ZIP file data preferably resides on a user's local computer in a file or a database, on an external device such as a Smart Card or other removable device, or in a shared data repository such as a directory service served by an LDAP server.

The present invention also provides multiple methods of checking whether a digital certificate is valid for use. These methods preferably include, but are not limited to standard methods of certificate validation, such as searching certificate revocation lists (CRL), certificate trust lists (CTL), and online checking via the internet using Online Certificate Status Protocol (OCSP) or Simple Certificate Validation Protocol (SCVP).

The method of the present invention also preferably defines data storage locations within the established .ZIP file format specification for storing information on the encryption parameters used when a file was encrypted and on the keys needed when a file is to be decrypted. One such example of these data storage locations includes a field to identify that a new strong encryption method has been applied to a file in the .ZIP file. The strong encryption record will be defined within a Central Directory storage area for each encrypted file. The Central Directory is a storage location defined in the .ZIP file format which serves as a table of contents for the entire .ZIP file. An entry is made into the Central Directory for each file added to a .ZIP file. A decryption record will be defined for storing the information needed to initialize and start the decryption process. This decryption record will be placed immediately ahead of the encrypted data for each file in a .ZIP file. This example is not the only method of storing this data as other storage methods can be defined.

The present invention provides many advantages or benefits over the prior art. One benefit is the ability to use multiple encryption methods instead of supporting only a single encryption method. A second benefit is the ability to use a mixture of symmetric and asymmetric encryption in a single, secure .ZIP file. A third benefit is that the encryption of individual files using advanced public/private keys provides a significantly higher level of security to computer users. A fourth benefit is that encryption of .ZIP file data can be implemented using a range of commonly available cryptographic toolkits. A fifth benefit is that the present invention supports using packaged or readily available encryption algorithms to provide state-of-the-art security. A sixth benefit is the availability of non-repudiation using digital signatures through the use of public/private key technology. A seventh benefit is that the invention ensures a high degree of interoperability and backward compatibility by extending the current .ZIP file format.

Various other features, objects, and advantages of the invention will be made apparent to those skilled in the art from the following detailed description, claims, and accompanying drawings.

DETAILED DESCRIPTION OF THE INVENTION

Figure 1:
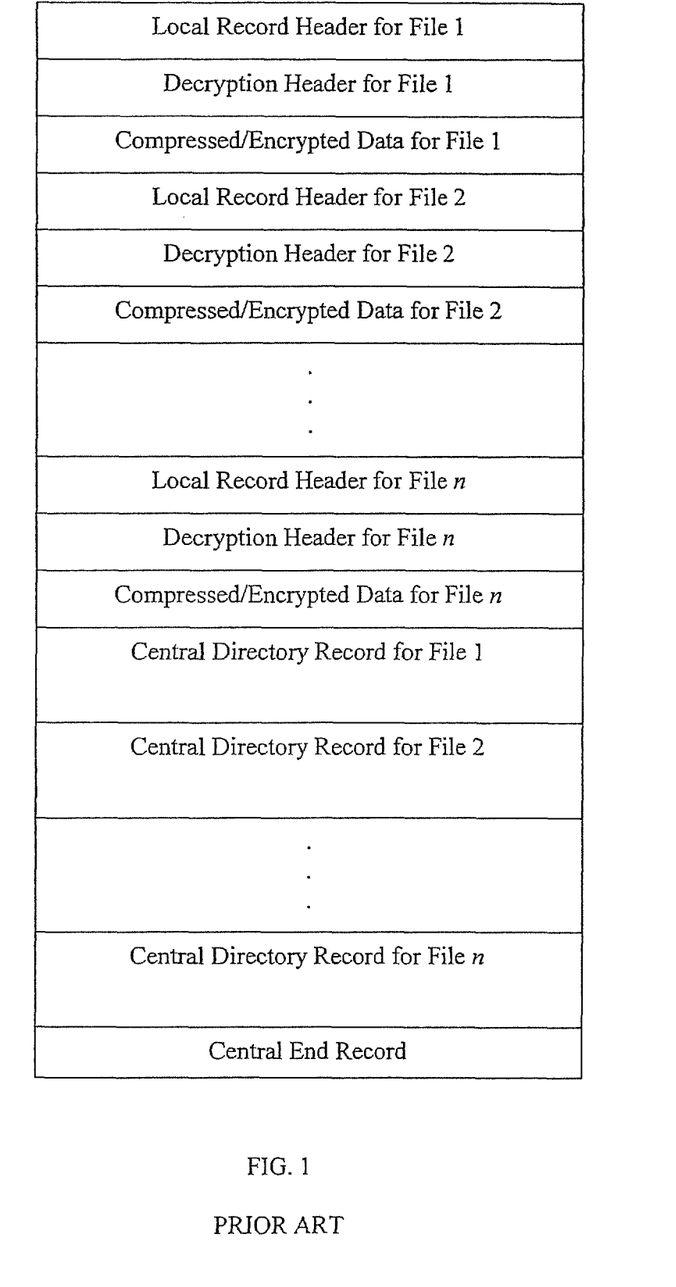
FIG. 1 is a record layout of a prior art .ZIP file prior to the present invention.
Figure 2:
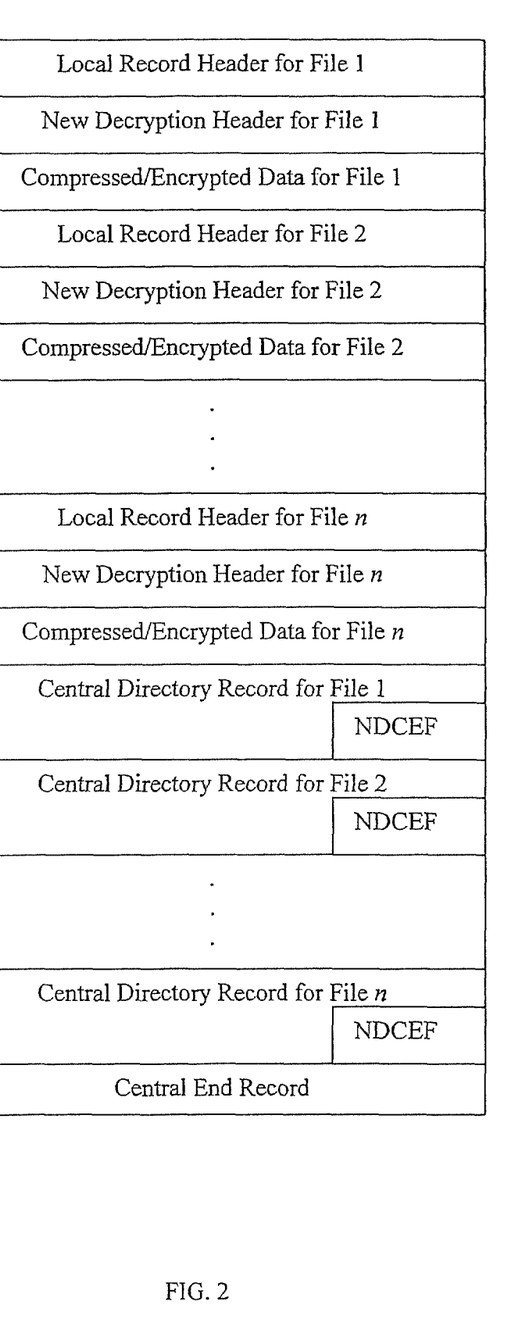
FIG. 2 is a record layout of a .ZIP file in accordance with the present invention.

Referring now to the drawings, FIG. 1 shows the file format for the standard .ZIP file, in existence prior to the present invention. FIG. 2 illustrates the preferred general record layout of a .ZIP file in accordance with the present invention.

The newly modified ZIP file format specification according to the present invention, as published by PKWARE, Inc., is described in a document entitled APPNOTE.TXT, which is incorporated herein by reference. The new version of the .ZIP file format provides an implementation of the use of strong encryption based on a key generated using a password. This implementation constitutes one example of a structure and layout of the records and fields suitable for processing secure .ZIP files as defined by the present invention. The complete description of the conventional or standard .ZIP file format will not be included here since this information is generally well known. Only the portions pertaining to the new records and fields defined by the new format, capable of storing data using strong encryption, will be discussed in detail.

The present invention extends the original .ZIP file format with the addition of new storage records to support the use of strong encryption methods including, as described above, both public/private key, or asymmetric, methods, and password-based, or symmetric, methods, and the capability to use a mixture of symmetric and asymmetric methods.

An example of implementing a new strong encryption method is discussed below. This example identifies several new records and fields that must be defined within the .ZIP file format.

A new General Purpose Bit Flag having a hexadecimal value of 0x0040 to be set in both the Local and Central Record Headers when strongly encrypting a file.

A new Decryption Header to be located immediately ahead of and adjacent to the compressed data stored for each file.

A new Extra Field record definition with an ID having a hexadecimal value of 0x0017 to be inserted into the Central Record Header for each file.

When using these new fields for strongly encrypting files, the following actions are indicated.

1. If the General Purpose Bit Flag value of 0x0040 is set to indicate strong encryption was applied to a file, the General Purpose Bit Flag value of 0x0001 will also generally be set.

2. Files having a size of zero bytes (an empty file) should not generally be encrypted. As indicated, however, the file characteristics of the archived files may be encrypted, even if the file is of zero length and is not itself encrypted.

3. The contents of the field labeled Version Needed to Extract in both the Local and Central Record Headers should preferably be set to the decimal value of 50 or greater. If the AES encryption method is used, the contents of the field labeled Version Needed to Extract in both the Local and Central Record Headers should preferably be set to the decimal value 51 or greater.

4. Data encryption should preferably be applied after a file is compressed, but encryption can be applied to a file if compression is not used. If compression is not applied to a file, it is considered to be stored in the .ZIP file.

5. If encryption is applied using digital certificates, a list of intended recipients will be constructed. Each entry in the recipient list identifies a person whose public key has been used in the encryption process for a file and who is allowed to decrypt the file contents using their private key.

Record Definitions:

| New Decryption Header (NDH) | | |
|---|---|---|
| Value | Size (bytes) | Description |
| IV size | 2 | Size of custom initialization vector/salt, if 0 then CRC32 + 64-bit File Size should be used to decrypt data. |
| IV | variable | Initialization vector/salt (file specific) which should be used in place of CRC32 + 64-BIT File Size |
| Original Size | 4 | Original (uncompressed) size of the following data |
| Decryption Info. | variable | Decryption Information |

Decryption Information (Details)

| Decryption Information (details) | | |
|---|---|---|
| Value | Size (bytes) | Description |
| Version (3) | 2 | Version/Format of decryption information. |
| AlgID | 2 | Encryption Algorithm ID |
| BitLen | 2 | Bit length of the key |
| Flags | 2 | Processing flags |
| ERD size | 2 | Size of Encrypted Random Data (ERD) |
| ERD | variable | Encrypted Random Data |
| Recipient Count | 4 | Number of Recipients |
| Hash Algorithm | 2 | Hash algorithm to be used to calculate Public Key hash (absent for password based encryption) |
| Hash Size | 2 | Size of Public Key hash (absent for password based encryption) |
| Recipient List Element | Variable | Recipient List Element (absent for password based encryption) |
| Password Validation Data size | 2 | Size of random password validation data (Includes CRC32 of PVD; >4) MUST be multiple of encryption block sizes |

Decryption Information (details)

| Value | Size (bytes) | Description |
|---|---|---|
| Password, Validation Data | Variable | Password Validation Data (PVD) |
| CRC32 of PVD | 4 | CRC32 of PVD, used for password verification when decrypting data |

Encryption Algorithm ID (AlgID) identifies which of several possible strong encryption algorithms was used for encrypting a file in the .ZIP file. The strong encryption algorithms that can be used include but are not limited to AES, 3DES, 2DES, DES, RC2 and RC4. The use of other unspecified strong algorithms for encryption is supported by the present invention.

Hash Algorithm identifies which of several possible hash algorithms was used for the encryption process for a file in the .ZIP file. The algorithms that can be used include but are not limited to MD5, SHA1-SHA512. The use of other unspecified algorithms for hashing is supported by the present invention.

Flags

The following values are defined for the processing Flags.

| Name | Value | Description |
|---|---|---|
| PASSWORD_KEY | 0x0001 | Password is used |
| CERTIFICATE_KEY | 0x0002 | Recipient List is used |
| COMBO_KEY | 0x0003 | Either a password or a Recipient List can be used to decrypt a file. |
| DOOUBLE_SEED_KEY | 0x0007 | Both password and Recipient List are required to decrypt a file. ERD is encrypted twice by 2 separate keys. |
| DOUBLE_DATA_KEY | 0x000f | Both a password and a Recipient List are required to decrypt a file. File data is encrypted twice using 2 separate keys. |
| MASTER_KEY_3DES | 0x4000 | Specified 3DES algorithm is used for MSK |

Recipient List Element

| Value | Size (bytes) | Description |
|---|---|---|
| Recipient Element size | 2 | Combined size of Hash of Public Key and Simple Key Blob |
| Hash | Hash Size | Hash of Public Key |
| Simple key Blob | variable | Simple Key Blob |

New Decryption Central Record Extra Field (NDCEF)

| Value | Size (bytes) | Description |
|---|---|---|
| 0x0017 | 2 | Signature of NDCEF |
| Data Size | 2 | Size of the following data (at least 12 bytes) |
| Version (2) | 2 | Version/Format of this extra field. |
| AlgID | 2 | Encryption Algorithm ID. |
| BitLen | 2 | Bit length of the key |
| Flags | 2 | Processing flags |
| Recipient Count | 4 | Number of Recipients |
| Hash Algorithm | 2 | Hash algorithm to be used to calculate Public Key hash (absent for password based encryption) |
| Hash Size | 2 | Size of Public Key hash (absent for password based encryption) |
| Simplified Recipient List Element | variable | Simplified Recipient List Element (absent for password based encryption) |

Simplified Recipient List Element

| Value | Size (bytes) | Description |
|---|---|---|
| Hash | Hash Size | Hash of Public Key |

A simplified recipient list element is defined as a subset of a recipient list element and is stored to provide redundancy of the recipient list data for the purposes of data recovery.

Process Flow:

The following is a description of the most preferred encryption/decryption process for a single file using the storage format defined by this example. Any programs, software or other processes available to suitably perform the encryption/decryption process may be used.

Encryption:
1. Validate public/private key
2. Calculate file digital signature and time-stamp
3. Compress or Store uncompressed file data
4. Generate a File Session Key (FSK) (see below)
5. Calculate Decryption Information size
6. Adjust Compressed Size to accommodate Decryption Information and padding
7. Save Decryption Information to .ZIP file
8. Encrypt Compressed or Stored File Data
9. Encrypt file characteristics Decryption:
1. Decrypt file characteristics
2. Read Decryption Information from .ZIP file
3. Generate FSK (see below)
4. Verify Decryption Information (see below)
5. If Decryption Information is valid, then decrypt Compressed or Stored File Data
6. Decompress compressed data
7. Validate file time-stamp and digital signature Generating Master Session Key (MSK)
1. If MASTER_KEY_3DES is set, use 3DES 3-key as MSK algorithm, otherwise use specified algorithm.
2. If encrypting or decrypting with a password.
  2.1.1. Prompt user for password
  2.1.2. Calculate hash of the password
  2.1.3. Pass calculated hash as argument into a cryptographic key derivation function or its equivalent.
3. When encrypting using a public key(s).
  3.1.1. Call a cryptographic key generation function or its equivalent to generate random key
4. When decrypting using a private key(s).
  4.1. Using Recipient List information, locate private key, which corresponds to one of the public keys used to encrypt MSK.
  4.2. Decrypt MSK Salt and/or Initialization Vector (IV)
1. For algorithms that use both Salt and IV, Salt=IV
2. IV can be completely random data and placed in front of Decryption Information
3. Otherwise IV=CRC32+64-bit File Size Adjusting Keys
1. Determine Salt and/or Initialization Vector size of the key for the encryption algorithm specified. Usually salt is compliment to 128 bits, so for 40-bit key Salt size will be 11 bytes. Initialization Vector is usually used by block algorithms and its size corresponds to the block size.

2. If Salt size>0 or Initialization Vector size is >0 then set IV.sup.1 to be used by the specified encryption algorithm. .sup.1 When adjusting MSK, if IV is smaller then required Initialization Vector (or Salt) size it is complimented with 0, if it is larger it is truncated. For all other operations IV is used as is without any modifications.

Generating File Session Key (FSK)
1. FSK<-SHA1(MSK(IV)). Adjust MSK with IV, and decrypt ERD (Encrypted Random Data). Calculate hash of IV+Random Data. Pass calculated hash as argument into a cryptographic key derivation function or its equivalent to obtain FSK.

Verifying Decryption Information
1. Decryption Information contains variable length Password Validation Data (PVD).
2. First Password Validation Data Size—4 bytes are random data, and last 4 bytes are CRC32 of that random data. This allows verification that the correct key is used and deters plain text attacks.

The following modifications are used for encrypting and decrypting multiple files.

Multi-File Encryption:
1. Generate MSK.
2. For each file follow Encryption steps.

Multi-File Decryption:
1. Generate MSK from the file Decryption Information
2. For each file follow Decryption steps
3. If Decryption Information verification fails go to step 1

Alternate storage formats can be defined for implementing the flexible security support within ZIP files. One such alternative is to use other fields, either existing or newly defined to denote that a strong encryption method was applied to a .ZIP archive. Another alternative could be to use additional storage fields in addition to those defined in the above example, or to use the fields as defined, but ordered differently within each record. Still other implementations may use fewer, or more, records or fields than are defined by the above example or the records and fields may be placed in other physical locations within the .ZIP file.

Alternate processing methods can also be defined for implementing the flexible security support within .ZIP files. One such alternative is to implement the encryption process for each file using another public/private key technology such as that defined by the OpenPGP Message Format as documented in RFC 2440. Another alternative could be to use a more direct form of encryption key generation where the file session key is directly used for encrypting each file. This method would not use the indirect form described in the above example where the file session key is derived from a master key.

While the invention has been described with reference to preferred embodiments, it is to be understood that the invention is not intended to be limited to the specific embodiments set forth above. Thus, it is recognized that those skilled in the art will appreciate that certain substitutions, alterations, modifications, and omissions may be made without departing from the spirit or intent of the invention. Accordingly, the foregoing description is meant to be exemplary only, the invention is to be taken as including all reasonable equivalents to the subject matter of the invention, and should not limit the scope of the invention set forth in the following claims.

I claim:

1. A method of placing data in a .ZIP file format data container on a computer, said method including:
   receiving a first data file at an application on a computer, wherein said first data file has been retrieved from an electronic computer data storage by said application;
   compressing said first data file to form a first compressed data file using said application before encrypting said first data file;
   encrypting said first compressed data file to form a first encrypted data file, wherein said encrypting uses symmetric encryption employing a first encryption method using a first symmetric key having a first symmetric key bit length,
   wherein said first symmetric key bit length is one of a plurality of available symmetric key bit lengths that may be used to perform said encrypting;
   placing said first encrypted data file in a data container using said application on said computer,
   wherein said data container is constructed in accordance with the .ZIP file format,
   wherein said data container includes an electronic indication that is set when said first compressed data file has been encrypted using a symmetric key having a symmetric key bit length greater than a predetermined bit length,
   wherein, when said first data file has been encrypted using a symmetric key having a symmetric key bit length greater than a predetermined bit length, said data container is modified to include:
      a first data field indicating the actual bit length of said first symmetric key;
      a second data field including an identification of said first encryption method employed in said encrypting, wherein said first encryption method is one of a plurality of available encryption methods selectable by a user using said application,
      wherein a plurality of encryption method identifiers for said plurality of available encryption methods are available using said application for inclusion as said identification; and
      a third data field identifying an encryption record version of said first encrypted data file, wherein said encryption record version is one of a plurality of available encryption record versions.

2. The method of claim 1 wherein said first symmetric key bit length is selected by a user for said first data file from a plurality of user-selectable symmetric key bit lengths.

3. The method of claim 1 wherein said first encryption method is selected by a user for said first data file from a plurality of user-selectable encryption methods.

4. The method of claim 1 further including:
   receiving a second data file at said application on said computer, wherein said second data file has been retrieved from electronic computer data storage by said application;
   encrypting said second data file to form a second encrypted data file, wherein said encrypting uses symmetric encryption employing a second encryption method using a symmetric key having a second symmetric key bit length,
   wherein said second symmetric key bit length is one of said plurality of available symmetric key bit lengths that may be used to perform said encrypting; and placing said second encrypted data file in said data container using said application on said computer.

5. The method of claim 4 wherein said second symmetric key bit length is not equal to said first symmetric key bit length.

6. The method of claim 5 wherein said second encryption method is not the same as said first encryption method.

7. The method of claim 5 wherein said data container is modified to include a fourth data field identifying an encryption record version of said second encrypted data file, wherein said encryption record version of said first encrypted file is not the same as said encryption record version of said second encrypted file.

8. The method of claim 4 wherein said second data file is compressed to form a second compressed data file using said application before encrypting said data file.

9. A method of constructing .ZIP file format data container on a computer, said method including:
receiving a first data file at an application on a computer, wherein said first data file has been retrieved from an electronic computer data storage by said application;
compressing said first data file to form a first compressed data file using said application before encrypting said first data file;
encrypting said first compressed data file to form a first encrypted data file, wherein said encrypting uses symmetric encryption employing a first encryption method using a first symmetric key having a first symmetric key bit length,
wherein said first symmetric key bit length is one of a plurality of user-selectable symmetric key bit lengths that may be used to perform said encrypting; and
electronically constructing a modified .ZIP format data container stored on said computer using said application,
wherein, when said first symmetric key bit length is at least as long as a predetermined bit length, said data container is modified to include:
an electronic indication that indicates that said data file has been encrypted using a symmetric key having a symmetric key bit length at least as long as a predetermined bit length;
a first data field indicating the actual bit length of said first symmetric key;
a second data field including an identification of said first encryption method employed in said encrypting, wherein said first encryption algorithm is one of a plurality of user-selectable encryption algorithms selectable by a user using said application,
wherein a plurality of encryption method identifiers for said plurality of user-selectable encryption algorithms are available using said application for inclusion as said identification; and
a third data field identifying an encryption record version of said first encrypted data file.

10. The method of claim 9 wherein said encryption record version of said first encrypted data file is one of a plurality of available encryption record versions.

11. The method of claim 9 wherein said first encryption method is selected by a user for said first data file from a plurality of user-selectable encryption methods.

12. The method of claim 9 further including:
receiving a second data file at said application on said computer, wherein said second data file has been retrieved from electronic computer data storage by said application;
encrypting said second data file to form a second encrypted data file, wherein said encrypting uses symmetric encryption employing a second encryption method using a symmetric key having a second symmetric key bit length,
wherein said second symmetric key bit length is one of said plurality of available symmetric key bit lengths that may be used to perform said encrypting; and
including said second encrypted data file in said data container using said application on said computer.

13. The method of claim 12 wherein said second symmetric key bit length is not equal to said first symmetric key bit length.

14. The method of claim 12 wherein said second encryption method is not the same as said first encryption method.

15. The method of claim 12 wherein said data container is modified to include a fourth data field identifying an encryption record version of said second encrypted data file, wherein said encryption record version of said first encrypted file is not the same as said encryption record version of said second encrypted file.

16. The method of claim 12 wherein said second data file is compressed to form a second compressed data file using said application before encrypting said data file.

* * * * *